(12) United States Patent
Byrd et al.

(10) Patent No.: US 10,274,973 B2
(45) Date of Patent: Apr. 30, 2019

(54) SEMI-CLOSED CIRCUIT UNDERWATER BREATHING APPARATUS RATIO REGULATOR

(71) Applicant: Carleton Life Support Systems Inc., Davenport, IA (US)

(72) Inventors: Gary Byrd, Donahue, IA (US); Chris Fellner, Blue Grass, IA (US); Misty Dowdal, Colona, IL (US)

(73) Assignee: Carleton Life Support Systems, Inc., Davenport, IA (US)

( * ) Notice: Subject to any disclaimer, the term of this patent is extended or adjusted under 35 U.S.C. 154(b) by 147 days.

(21) Appl. No.: 15/486,736

(22) Filed: Apr. 13, 2017

(65) Prior Publication Data

US 2017/0297665 A1    Oct. 19, 2017

Related U.S. Application Data

(60) Provisional application No. 62/321,982, filed on Apr. 13, 2016.

(51) Int. Cl.
*G05D 11/035* (2006.01)
*B63C 11/22* (2006.01)

(52) U.S. Cl.
CPC ........ *G05D 11/035* (2013.01); *B63C 11/2209* (2013.01); *B63C 11/2227* (2013.01); *Y10T 137/2564* (2015.04)

(58) Field of Classification Search
CPC . B63C 11/2227; B63C 11/2236; B63C 11/24; Y10T 137/2564; G05D 11/035
See application file for complete search history.

(56) References Cited

U.S. PATENT DOCUMENTS

| 3,308,817 | A | * | 3/1967 | Seeler | B01F 3/028 128/203.25 |
| 3,524,444 | A | * | 8/1970 | Ellard | B63C 11/24 128/201.27 |
| 3,669,134 | A | * | 6/1972 | Dobritz | A61M 16/104 128/203.25 |

(Continued)

FOREIGN PATENT DOCUMENTS

| FR | 2191050 | 2/1974 |
| WO | 8804409 | 6/1988 |
| WO | 2012025834 | 3/2012 |

*Primary Examiner* — Kevin F Murphy
(74) *Attorney, Agent, or Firm* — Woods Oviatt Gilman LLP; Katherine H. McGuire, Esq.

(57) ABSTRACT

An apparatus for adjusting the partial pressure of gaseous mixtures comprises a housing and piston. The housing defines a chamber coupled to an oxygen metering orifice, diluent metering orifice, vent port and gas outlet. The oxygen metering orifice provides oxygen to the chamber and the diluent metering orifice provides diluent gas to the chamber. The piston is movably positioned in the chamber and includes first and second sealing devices. The chamber is sectioned into a mixing chamber, a diluent chamber and a reference chamber located between the mixing chamber and diluent chamber. The diluent chamber receives a diluent gas referenced at ambient pressure and the reference chamber is charged with a gas having a reference pressure. The piston changes positions within the chamber depending on a force balance created by a pressure differential between the reference pressure and ambient pressure.

5 Claims, 5 Drawing Sheets

(56) References Cited

U.S. PATENT DOCUMENTS

| | | | |
|---|---|---|---|
| 3,788,311 A * | 1/1974 | Fahlman | B63C 11/24 128/205.11 |
| 4,226,257 A | 10/1980 | Trinkwalder | |
| 5,097,860 A | 3/1992 | Ferguson et al. | |
| 5,241,955 A | 9/1993 | Dearman et al. | |
| 5,411,018 A * | 5/1995 | Rinehart | A62B 7/02 128/201.27 |
| 5,678,541 A | 10/1997 | Garraffa | |
| 6,257,275 B1 | 7/2001 | Fubish et al. | |
| 6,895,961 B1 | 5/2005 | Todorov | |
| 7,418,976 B2 | 9/2008 | Henley et al. | |
| 7,681,588 B2 | 3/2010 | De Leeuw | |
| 7,757,710 B2 | 7/2010 | Larsen et al. | |
| 8,424,561 B1 | 4/2013 | Rowe | |
| 2007/0017524 A1 | 1/2007 | Wilson, Jr. et al. | |
| 2009/0071550 A1 | 3/2009 | Patterson et al. | |
| 2009/0250062 A1 | 10/2009 | Reynolds | |
| 2011/0041848 A1 | 2/2011 | Stone et al. | |
| 2011/0297153 A1 | 12/2011 | Grimsey | |

\* cited by examiner

SEMI-CLOSED CIRCUIT UNDERWATER BREATHING APPARATUS RATIO REGULATOR

BACKGROUND OF THE INVENTION

Semi-closed circuit underwater breathing apparatus have been in use for over twenty years. These apparatus recycle a diver's exhaled breath through a carbon dioxide scrubber and add oxygen back into the circuit to replace the oxygen metabolized by the diver. The partial pressure of the oxygen in the circuit must be controlled based on depth; if the partial pressure is too low the diver can suffer from hypoxia which can lead to unconsciousness and death. On the other hand, in dives exceeding 10 meters in depth, the diver can suffer from oxygen toxicity if the oxygen partial pressure is too high which can lead to central nervous system damage, convulsions and death. Existing mechanical breathing apparatus that are used for depths exceeding 10 meters use two cylinders to provide the breathing gas; one is oxygen while the other is a diluent gas which is blended with the oxygen in a regulator, commonly referred to as a ratio regulator, to provide a safe gas mixture based on depth. A cross section of an existing ratio regulator 10 is shown in FIG. 1.

Regulator 10 provides a fixed flow of oxygen 11 into mixing chamber 12 regardless of depth via an absolute pressure regulator 14 and fixed oxygen metering orifice 16 and a variable flow of diluent gas 13 (e.g., $N_2$ or He gas) that is a function of depth via diluent valve 18, diluent orifice 20 and diluent regulator 22 which is referenced to ambient pressure. Regulator 10 uses two elastomeric diaphragms 24, 26 to trap air in a chamber 28 to provide a reference pressure of 1 atmosphere absolute (1 ATA) and a third diaphragm 30 to form diluent chamber 32 which provides diluent pressure loading when the depth exceeds approximately 6 meters. The force balance resulting from gas pressures and diluent offset spring 34 acting on valve assembly 36 provides a gas mix 15 that is 100% oxygen at depths less than 6 meters and increasingly diluted with nitrogen or helium enriched gas as the depth increases.

Current ratio regulators, such as regulator 10, have several drawbacks. First, in order to meet the operating pressure requirements, the diaphragms are fabric reinforced material which have inconsistent properties. Small differences in thickness and stiffness are sufficient to alter the force balance enough to allow the oxygen concentration to move outside a specified range. Preloading past the normal use length for a specified length of time is often needed to stabilize the performance enough to insure that the equipment can be calibrated within specification.

Secondly, due to the relatively large diaphragm area, helium within diluent chamber 32 can diffuse through the diaphragm and into the 1 ATA reference chamber 28 thereby causing a shift in the partial pressure of the breathing mix. In order to prevent this, it is necessary to use third diaphragm 30 to form a chamber 38 which is then vented to ambient via hole 40. Hole 40 is exposed to salt water and debris which fill the regulator chamber and may result in plugging of hole 40, as well as requiring more effort to clean regulator 10 during maintenance after each use.

Lastly, the assembly of the three diaphragms 24, 26, 30 and five compression plates 42, 44, 46, 48, 50 is difficult and presents a large number of leak paths which can negatively affect reliability and performance.

Thus, there is a need for a ratio regulator that is not susceptible to salt water contamination, thus resulting in faster and easier assembly, testing and maintenance. The present invention addresses these, as well as other, needs.

SUMMARY OF THE INVENTION

In view of the above and in accordance with an aspect of the present invention, the present invention is generally directed to an apparatus for adjusting the partial pressure of gaseous mixtures. The apparatus may comprise a housing and piston wherein the housing defines a chamber coupled to each of an oxygen metering orifice, diluent metering orifice, vent port and gas outlet. The oxygen metering orifice provides oxygen to the chamber from an oxygen inlet and the diluent metering orifice provides diluent gas to the chamber from a diluent inlet. The piston is movably positioned in the chamber and includes first and second sealing devices thereby sectioning the chamber into a mixing chamber coupled to the oxygen metering orifice and the gas outlet, a diluent chamber coupled to the diluent inlet and the diluent metering orifice and a reference chamber disposed between the mixing chamber and the diluent chamber. The diluent chamber receives a diluent gas referenced at ambient pressure and the reference chamber is charged with a gas having a reference pressure. The piston may change positions within the chamber depending on a force balance created by a pressure differential between the reference pressure and ambient pressure so as to output a mix gas having a proper oxygen-to-diluent gas ratio.

In a further aspect of the present invention, the piston may include an internal leak path whereby the diluent chamber may fluidly communicate with the mixing chamber upon leaking of diluent gas past the second sealing device.

In another aspect of the present invention, the piston further includes a third sealing device interposed between the first and second sealing devices and wherein the internal leak path is located between the second and third sealing devices.

In still another aspect of the present invention, the apparatus may further comprise a valve actuation assembly between the diluent inlet and the diluent chamber. The valve actuation assembly may be coupled to the piston whereby movement of the piston actuates the valve actuation assembly so as to selectively open or close a valve. The valve is configured to inject diluent gas from the diluent inlet to the diluent chamber when open.

In yet a further aspect of the present invention, the chamber may further include a vent port fluidly coupling the reference chamber to ambient. The vent port may be sealed after seating of the piston in the chamber during assembly of the apparatus so as to maintain the reference chamber at the reference pressure during use.

DESCRIPTION OF INVENTION

Figure 1:
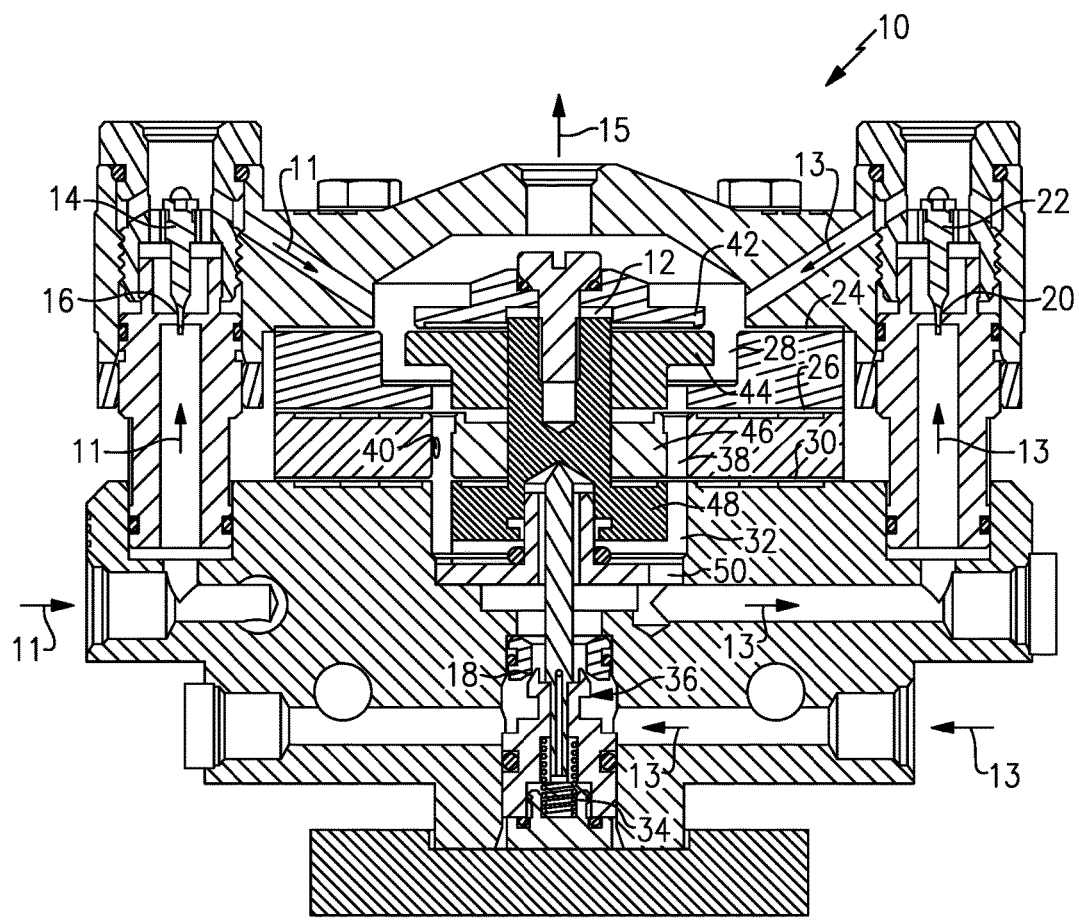
FIG. 1 is a cross section view of a prior art ratio regulator suitable for use within a semi-closed mechanical breathing apparatus.
Figure 2:
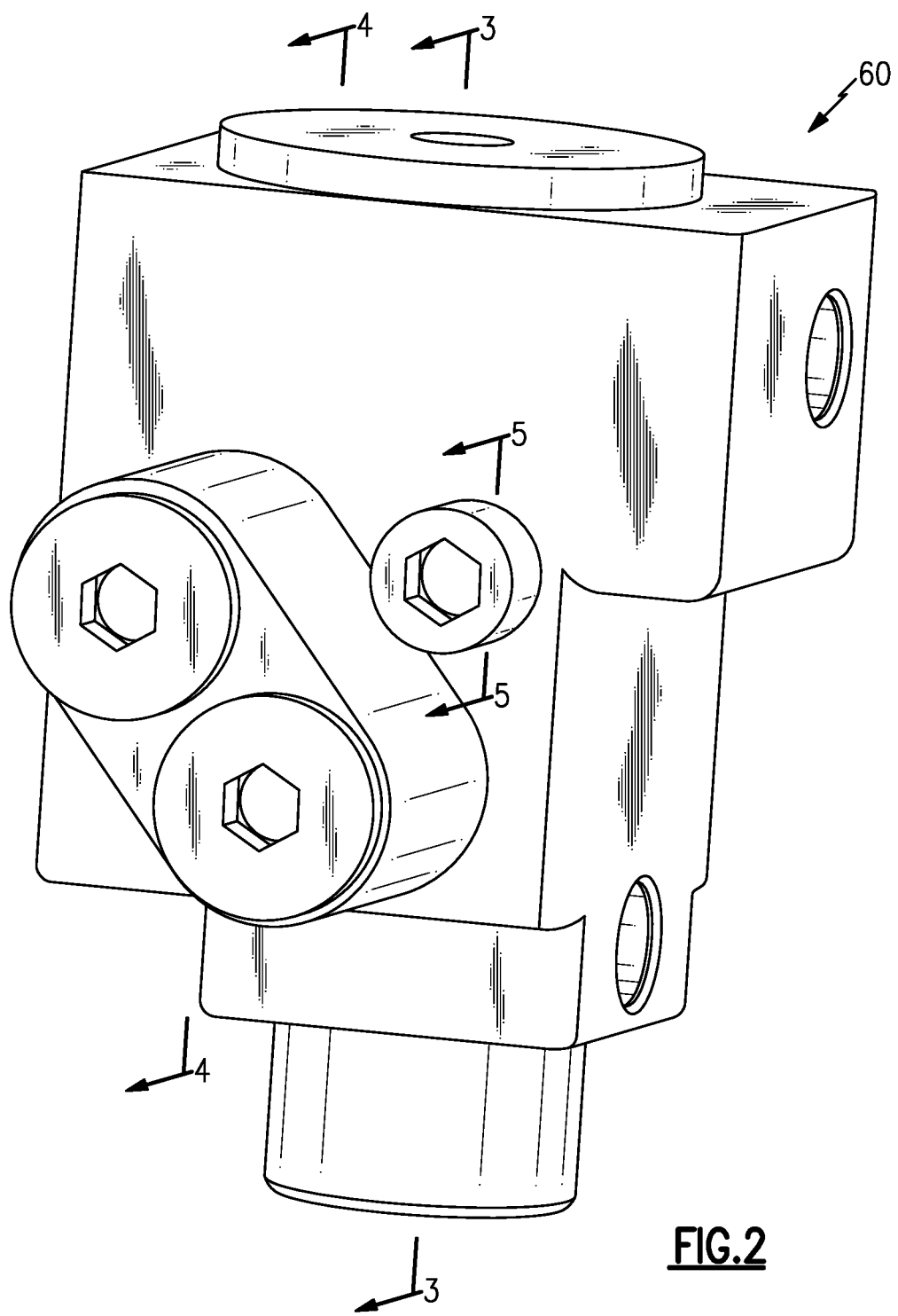
FIG. 2 is a perspective view of a ratio regulator in accordance with an aspect of the present invention.
Figure 3:
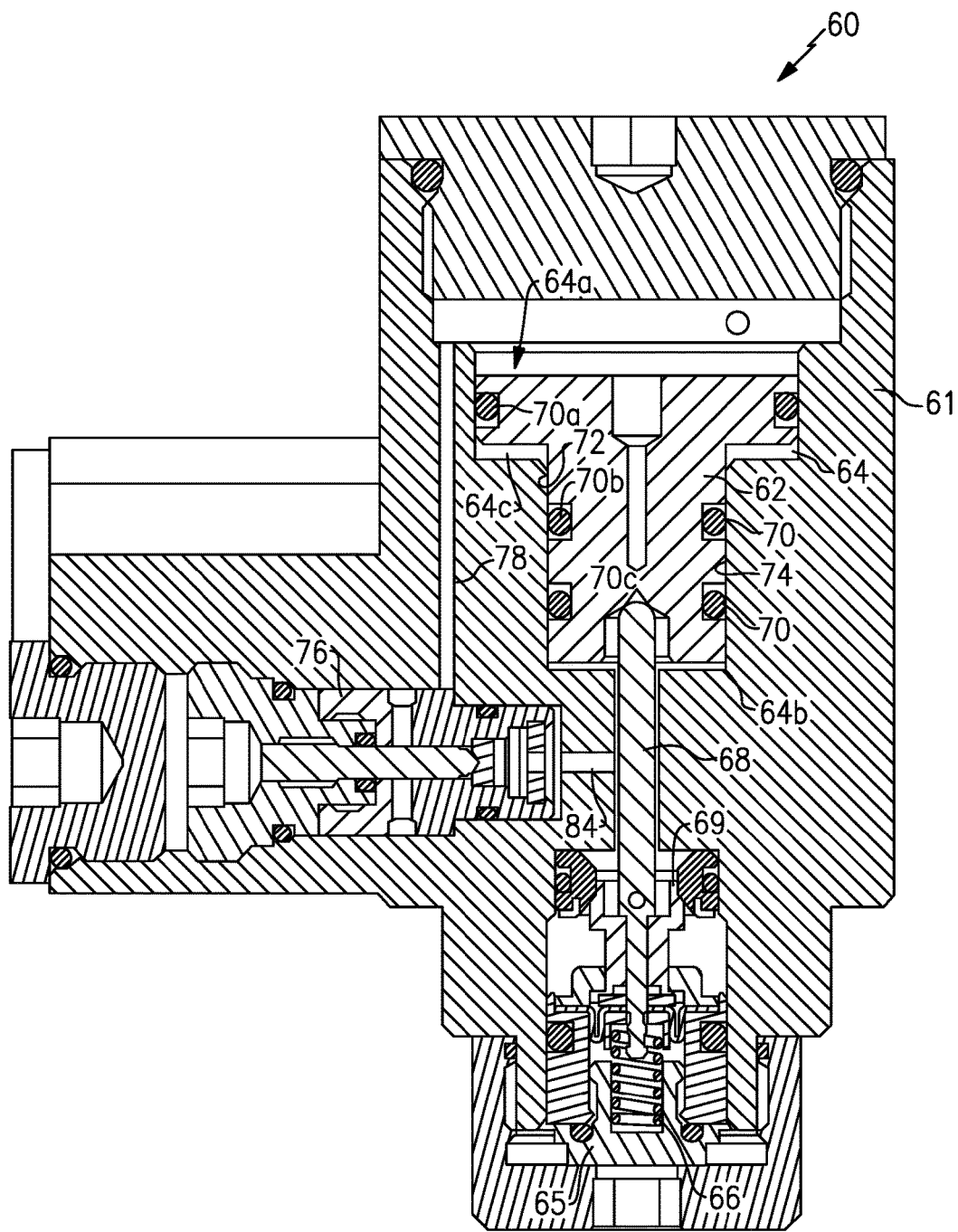
FIG. 3 is a cross section view of the ratio regulator shown in FIG. 2 taken generally along line 3-3 and showing a diluent regulator thereof.

With reference to FIGS. 2-6, a ratio regulator 60 may be configured for use within a semi-closed underwater breathing apparatus (not shown) in accordance with an aspect of the present invention. In one aspect of the present invention, assembly and test time of ratio regulator 60 may be approximately 25% of the time required for the assembly and testing of prior art regulator 10 shown in FIG. 1. As shown in FIGS. 3-6, a piston 62 may be configured for sliding engagement within regulator chamber 64 defined by regulator housing 61 of regulator 60. Piston 62 may be coupled to a valve actuation assembly 65, such as spring 66 via assembly rod 68, thereby enabling opening of diluent valve 69 upon axial movement of piston 62 within chamber 64 as a function of diver depth. Piston 62 may include one or more sealing devices 70 (such as but not limited to O-rings, as shown) being disposed on piston 62 circumferential surface 72 in slidable sealing engagement against interior wall 74 of chamber 64. In one aspect of the present invention, three O-rings 70a, 70b and 70c may disposed along piston 62 in spaced relation to one another. In this manner, O-rings 70a, 70b, and 70c may work in combination to form distinct chamber sections within housing 61 as will be discussed in greater detail below.

Figure 4:
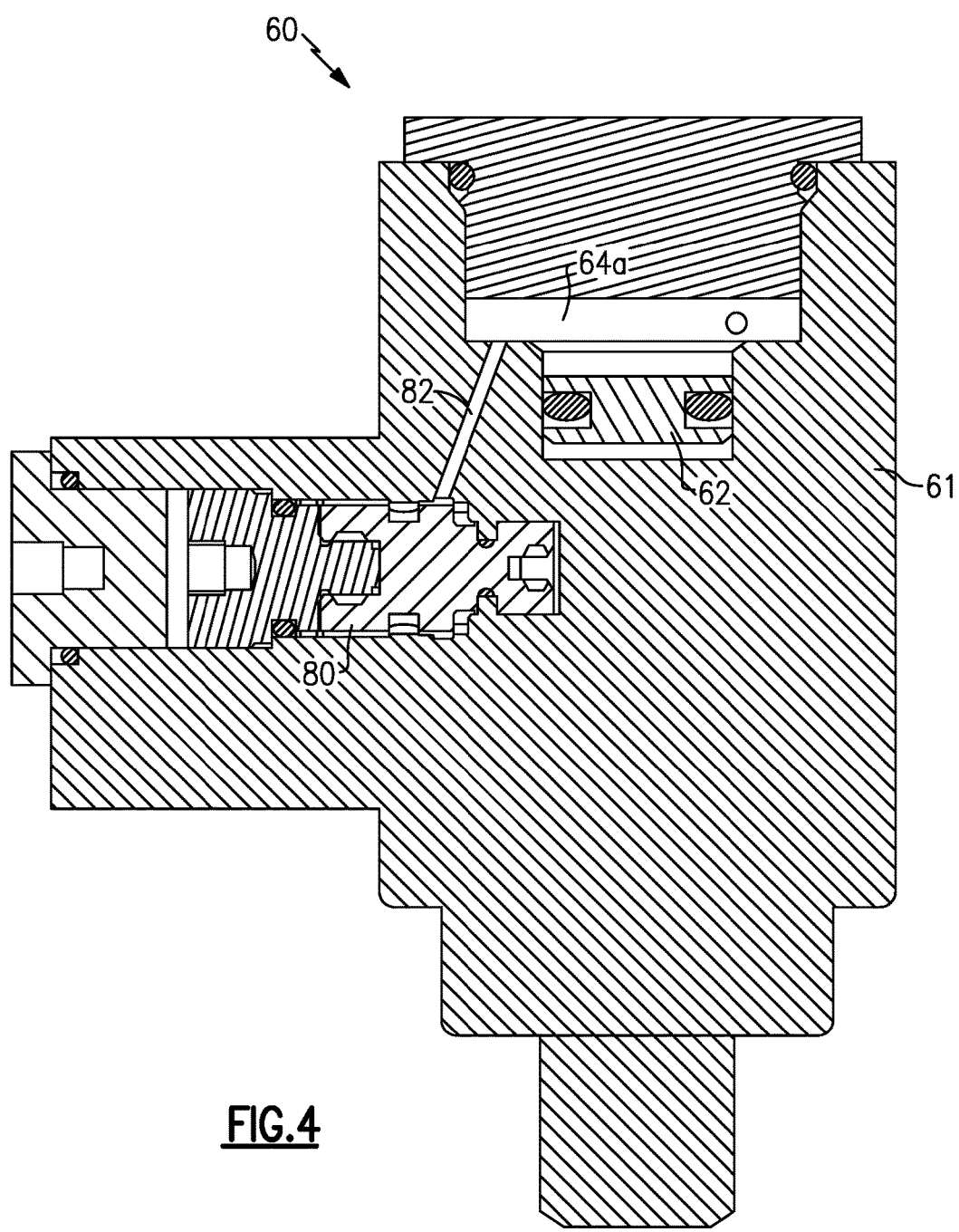
FIG. 4 is a cross section view of the ratio regulator shown in FIG. 2 taken generally along line 4-4 and showing an oxygen regulator thereof.
Figure 5:
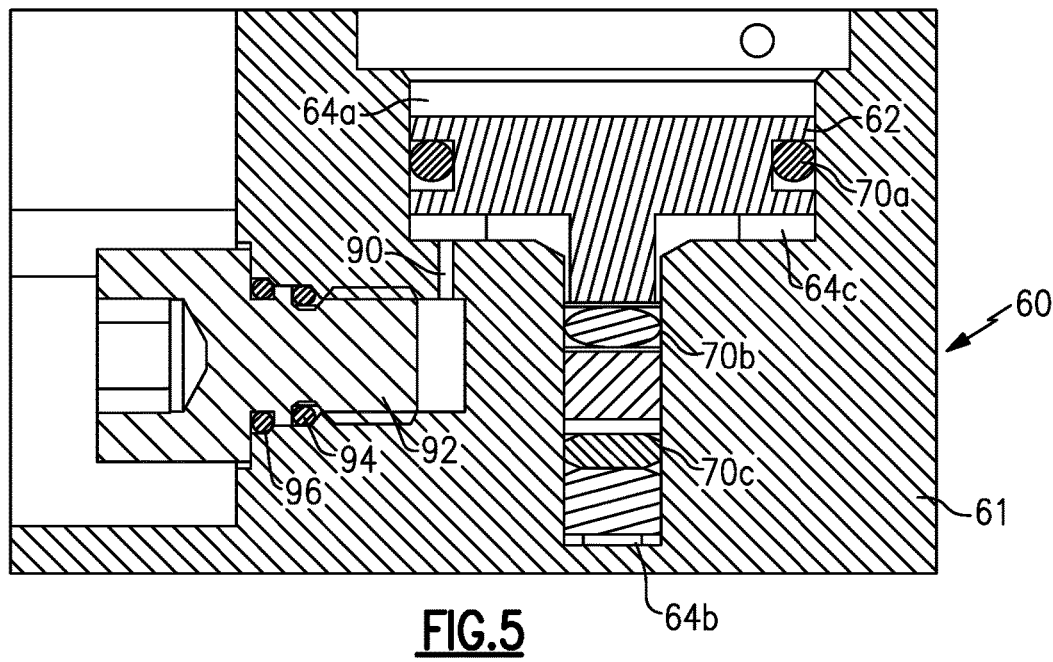
FIG. 5 is an expanded cross section view of the ratio regulator shown in FIG. 2 taken generally along line 5-5 and showing a vent port thereof.

In particular, mixing chamber 64a may be in fluid communication with diluent regulator 76 via coupling line 78 (FIG. 3) and oxygen regulator 80 via coupling line 82 (FIG. 4). Mixing chamber 64a is configured to receive a fixed flow of oxygen as described above. Diluent chamber 64b selectively receives diluent gas (e.g., $N_2$ or He) and is fluidly coupled to diluent regulator 76 via metered orifice 84. Diluent chamber 64b is configured to receive diluent gas at a pressure particular to the variable flow regulated by diluent offset spring 66 acting on assembly rod 68 as described above and with reference to diluent offset spring 34 and valve assembly 36 of FIG. 1.

Reference chamber 64c may be disposed between mixing chamber 64a and diluent chamber 64b. Reference chamber 64c may be charged with and calibrated to hold a reference gas at a pressure of 1 atmosphere absolute (1 ATA). To that end, and as shown most clearly in FIG. 5, ratio regulator 60 may further include a vent port 90 configured to vent reference chamber 64c during assembly and calibration of ratio regulator 60. Vent port 90 may then be sealed, such as through use of a threaded plug 92 with redundant seals 94, 96 (such as O-rings) after piston 62 is fully seated in chamber 64. Plug 92 may seal reference chamber 64c so as to prevent ingress of salt water or debris during use. Omission of vent port 90 would result in an increase in the gas pressure in the reference chamber 64c when piston 62 is inserted within chamber 64 and set into its final position. Such an increase in gas pressure would introduce a calibration error during assembly. In this manner, piston 62 may change positions relative to the force balance of the pressure differential occurring between mixing chamber 64a and diluent chamber 64b.

Figure 6:
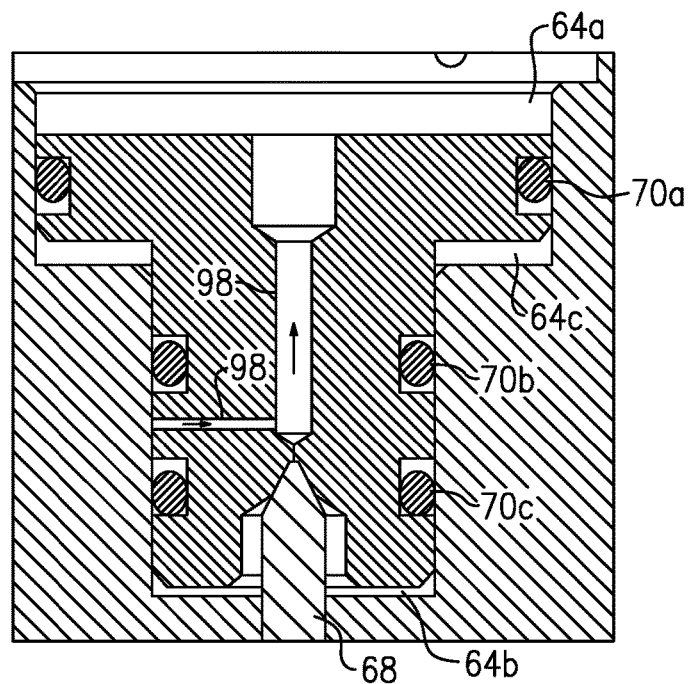
FIG. 6 is an exploded cross section view of FIG. 3 showing the piston and an associated leak path therein.

With reference to FIG. 6, to prevent leakage of diluent gas (e.g., He) into reference chamber 64c, piston 62 may define a leak path 98 therein extending from diluent chamber 64b to mixing chamber 64a. As a result, any diluent gas that may circumvent O-ring 70c may pass through piston 62 from diluent chamber 64b to mixing chamber 64a without changing the 1 ATA reference pressure with reference chamber 64c. As a result, diluent leaks circulate within ratio regulator 60 such that leak path 98 alleviates the need for an opening within housing 61 (i.e., hole 40 of regulator 10) which could allow for the unwanted entrance of salt water and debris into chamber 64.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. An apparatus for adjusting the partial pressure of gaseous mixtures, comprising:
   a. a housing defining a chamber fluidly coupled to each of an oxygen metering orifice, diluent metering orifice and gas outlet, the oxygen metering orifice configured to provide oxygen to the chamber from an oxygen inlet, the diluent metering orifice configured to provide diluent gas to the chamber from a diluent inlet; and
   b. a piston movably positioned in the chamber, the piston including first and second sealing devices thereby sectioning the chamber into a mixing chamber fluidly coupled to the oxygen metering orifice and the gas outlet, the mixing chamber configured to selectively receive oxygen and diluent gas; a diluent chamber fluidly coupled to the diluent inlet and the diluent metering orifice, the diluent chamber configured to receive a diluent gas; and a reference chamber disposed between the mixing chamber and the diluent chamber, the reference chamber configured to by charged with a gas having a reference pressure;
   wherein the piston is configured to change positions within the chamber depending on a force balance created by a pressure differential between the reference pressure and the diluent gas pressure so as to output a mix gas having a proper oxygen-to-diluent gas ratio.

2. The apparatus of claim 1 wherein the piston further includes an internal leak path whereby the diluent chamber fluidly communicates with the mixing chamber upon leaking of diluent gas past the second sealing device.

3. The apparatus of claim 2 wherein the piston further includes a third sealing device interposed between the first and second sealing devices and wherein the internal leak path is located between the second and third sealing devices.

4. The apparatus of claim 1 further comprising a valve actuation assembly between the diluent inlet and the diluent chamber, the valve actuation assembly coupled to the piston whereby movement of the piston actuates the valve actuation assembly so as to selectively open or close a valve, the valve configured to inject diluent gas from the diluent inlet to the diluent chamber when open.

5. The apparatus of claim 1 wherein the chamber further includes a vent port fluidly coupling the reference chamber to ambient, the vent port being sealed after seating of the piston in the chamber during assembly of the apparatus so as to maintain the reference chamber at the reference pressure during use.

* * * * *